United States Patent
Ishizaki

(10) Patent No.: US 8,125,258 B2
(45) Date of Patent: Feb. 28, 2012

(54) PHASE SYNCHRONIZATION DEVICE AND PHASE SYNCHRONIZATION METHOD

(75) Inventor: Haruya Ishizaki, Tokyo (JP)

(73) Assignee: NEC Corporation, Tokyo (JP)

( * ) Notice: Subject to any disclaimer, the term of this patent is extended or adjusted under 35 U.S.C. 154(b) by 20 days.

(21) Appl. No.: 12/865,192

(22) PCT Filed: Jan. 29, 2009

(86) PCT No.: PCT/JP2009/051406
§ 371 (c)(1),
(2), (4) Date: Jul. 29, 2010

(87) PCT Pub. No.: WO2009/098989
PCT Pub. Date: Aug. 13, 2009

(65) Prior Publication Data
US 2010/0308879 A1      Dec. 9, 2010

(30) Foreign Application Priority Data
Feb. 4, 2008    (JP) ................................. 2008-023779

(51) Int. Cl.
*H03L 7/00* (2006.01)
*H03D 3/18* (2006.01)

(52) U.S. Cl. ........ 327/161; 327/149; 327/153; 327/158; 329/307; 375/327; 375/376

(58) Field of Classification Search ................ 327/149, 327/153, 158, 161, 244; 329/304, 306, 307, 329/310, 345, 346; 375/279, 324, 327, 329, 375/340, 373, 376; 455/214, 337
See application file for complete search history.

(56) References Cited

U.S. PATENT DOCUMENTS

| | | | | |
|---|---|---|---|---|
| 5,121,070 A | * | 6/1992 | Tomita | 329/304 |
| 7,729,455 B2 | * | 6/2010 | Mizukami | 375/329 |
| 7,760,819 B2 | * | 7/2010 | Ishizaki et al. | 375/316 |
| 7,979,047 B2 | * | 7/2011 | Miyano et al. | 455/334 |

FOREIGN PATENT DOCUMENTS

| | | |
|---|---|---|
| JP | 5-48663 A | 2/1993 |
| JP | 5-110610 A | 4/1993 |
| JP | 6-30063 A | 2/1994 |
| JP | 6-69760 A | 3/1994 |

(Continued)

OTHER PUBLICATIONS

International Search Report for PCT/JP2009/051406 mailed Mar. 17, 2009.

(Continued)

*Primary Examiner* — Patrick O'Neill

(57) ABSTRACT

A sampling section (100A) includes a sampling filter (102) that converts a continuous-time signal into a discrete-time signal and applies filtering of low-pass characteristics and a one-bit quantizer (107) that outputs a quantized signal representing a time-dependent change in the discrete-time signal. A synchronization section (100B) includes a phase difference detector (110) that calculates the phase difference between an inspection signal and the quantized signal and a delay control circuit (114) that feeds back the inspection signal to the phase difference detector at the timing set in consideration of a delay amount corresponding to the phase difference. When the phase difference between the inspection signal and the current quantized signal shows the same phase, the phase of the inspection signal is detected as a reference phase.

10 Claims, 12 Drawing Sheets

FOREIGN PATENT DOCUMENTS

| | | |
|---|---|---|
| JP | 9-130443 A | 5/1997 |
| JP | 9-224063 A | 8/1997 |
| JP | 10-190468 A | 7/1998 |
| JP | 2002094585 A | 3/2002 |
| JP | 2002124999 A | 4/2002 |
| JP | 2006041580 A | 2/2006 |
| JP | 2007189666 A | 7/2007 |
| WO | 2006046632 A | 5/2006 |

OTHER PUBLICATIONS

D. M. Pozar, "Microwave and RF Design of Wireless Systems", Wiley, Nov. 17, 2000, pp. 318.

* cited by examiner

PHASE SYNCHRONIZATION DEVICE AND PHASE SYNCHRONIZATION METHOD

This application is the National Phase of PCT/JP2009/051406, filed Jan. 29, 2009, which is based upon and claims the benefit of priority from prior Japanese Patent Application No. 2008-023779 (filed Feb. 4, 2008), the entire contents of which are incorporated herein by reference.

TECHNICAL FIELD

The present invention relates to a technique for demodulating a phase-modulated reception signal.

BACKGROUND ART

Now, as represented by the field of terrestrial broadcast, data communication is rapidly being shifted from analog modulation to digital modulation. The digital modulation is roughly divided into three according to a data value to be transmitted: ASK (Amplitude Shift Keying) that controls the amplitude of a carrier wave; FSK; and (Frequency Shift Keying) that controls the frequency of a carrier wave; and PSK (Phase Shift Keying) that controls the phase of a carrier wave. In the above three digital modulations, overlapping between data of "0" and data of "1" in the phase plane becomes smaller in the order of ASK, FSK, and PSK.

Now, assume that, in BASK (Binary Phase Shift Keying), data of "1" is represented by a carrier wave and data of "0" is represented by a carrier obtained by inverting the phase of the carrier wave representing "1" by 180 degrees, and that the phases thereof are switched instantaneously so as not to allow a stationary point of the phase to occur at the time of data switching. In this case, overlapping between "1" and "0" does not exist in the analytic viewpoint. That is, in the above assumption, the probability that a reception signal of "0" is erroneously read out as data of "1" is 0 in the analytic viewpoint, excluding influence of noise mixed in a circuit or transmission lime. Thus, a satisfactory bit error rate can be realized.

FIG. 12 is a graph illustrating, according to the type of the digital modulation method, a relationship between a value obtained by dividing the energy allocated to each bit of a reception signal by a noise power and bit error rate. This is disclosed in NPL 1 to be described later. As is clear from the graph, in the case where the SNR (Signal-to-Noise Ratio) of a reception signal, i.e., a value proportional to that plotted on the horizontal axis is the same between the modulation methods, the PSK exhibits the most satisfactory bit error rate.

By selecting the PSK as the modulation method, it is possible to achieve a desired bit error rate while reducing the required SNR to the smallest possible. Further, in this case, it is possible to increase the estimation tolerance of noise to be mixed in a reception circuit during signal input to signal demodulation. This enables an increase of the tolerance of thermal noise to be set in a low noise amplifier of a wireless reception circuit, with the result that power reduction of a reception circuit can be achieved.

Unlike the ASK and FSK, the PSK requires a reference phase in demodulation. The reason for this will be described below.

In the case of a digital modulation (for example, binary FSK) other than the PSK, a signal whose phase advances from 0 degrees to 90 degrees with respect to a carrier wave and a signal whose phase advances from 90 degrees to 180 degrees have the same digital data. A reception side determines whether the modulation with respect to a carrier wave is modulation in the phase-advance direction or modulation in the phase-delay direction to thereby acquire digital data. Further, in data demodulation on the reception side, the phase of the carrier wave need not be made to coincide with that on the transmission side.

On the other hand, in the case of the PSK, digital data corresponds to the phase shift amount of the carrier wave, so that a signal whose phase is shifted by 45 degrees with respect to the carrier wave and a signal whose phase is shifted by 225 degrees with respect to the carrier wave have different data. Thus, in order to properly reproduce data from a PSK reception signal, it is necessary to have a reference phase for correctly demodulating a phase-shifted reception signal.

In the case of, e.g., a wired communication with low data rate, a clock required for reading out data can be sent through a communication line provided separately from a communication line of the data. Thus, it is comparatively easy to grasp the reference phase on the reception side in the case of a wired communication. However, in the case of a wireless communication, there exists only one physical transmission line, so that it is difficult to simultaneously send the clock required for demodulation and data.

In order to cope with the above difficulty, a configuration is required in which a clock previously prepared on the reception side is made to be phase-synchronized with the carrier wave of a reception signal to find a correct reference phase for use in demodulation. Processing that detects the reference phase in such a manner is referred to as carrier wave recovery. The lower the synchronization accuracy is, the higher the bit error rate becomes. Thus, in order to improve digital communication quality, it is extremely important to develop a technique for realizing highly accurate carrier wave recovery.

In the current wireless communication environment, the ASK or FSK is still mainly used in UHF band, while in ISM band (Industry Science Medical band) of 2.4 GHz, Bluetooth®, ZIGBee®, or the like adopts the PSK. Thus, there is a demand of developing the carrier wave recovery technique also in the application to a weak power band like the ISM band.

For the carrier wave recovery, a feedback loop called Costas loop is used. This feedback loop is implemented in the analog signal region that has been frequency-converted by, e.g., a mixer.

Along with progress of a recent LSI technology and digital signal processing technique, there has been proposed a technique for realizing the feedback loop in the digital signal region after A/D Conversion. PTL 1 and PTL 2 disclose such a technique. In this technique, the phase of a received modulation signal and carrier wave phase in a reception circuit are A/D converted and then multiplied in a complex multiplier to detect the phase difference between them. Then, a loop filter is used to remove signal components other than a desired signal component from the reception signal and, after that, a numerically-controlled oscillator is used to output a synchronization correction signal.

CITATION LIST

Patent Literature

{PTL 1} JP-A-2002-094585
{PTL 2} JP-A-2002-124999
{NPL 1} DAVID M. POZAR, "MICROWAVE AND RF DESIGN OF WIRELESS SYSTEMS"; Chapter 9: Modulation Techniques, JOHN WILEY & SONS, New York, 2000, page 318

SUMMARY OF INVENTION

Technical Problem

With regard to phase synchronization processing in the carrier wave recovery, the technique based on the Costas loop that uses the analog signal region and technique disclosed in PTL 1 and PTL 2 that used the digital signal region have the following problems.

First, in the carrier wave recovery technique based on the Costas loop, although phase synchronization can be realized with high accuracy in the analog signal region, it is difficult to reduce the size of a circuit for cost reduction. The reason is that it is necessary to provide an analog circuit such as an analog mixer for multiplying a reception signal and a demodulation clock or an analog low-pass filter for removing high-frequency noise from a signal representing a phase difference for smoothing. It is difficult to reduce the size of the above analog circuit following miniaturization of a CMOS.

Secondly, in the carrier wave recovery technique based on the Costas loop, in the case where the phase synchronization is performed in the analog signal region, it is difficult to externally control characteristics such as time constant required for the synchronization. The reason is that an analog signal is used in the feedback loop, and the filter itself is an analog circuit, so that it is difficult to change a loop transfer function by an external digital control signal.

Thirdly, in the carrier wave recovery technique based on the Costas loop, it is necessary to mount, in addition to an oscillator for generating a high-frequency RF signal, a synchronization circuit for performing further feedback in a middle or higher frequency band, and a demodulation circuit separately provided from the synchronization circuit. This increases the design period and circuit size, which may result in an increase in cost.

In the technique disclosed in PTL 1 and PTL 2 that performs the phase synchronization in the digital signal region, when compared with the technique using the analog signal region, external control and circuit size reduction can be achieved more easily, but disadvantageous in power reduction. The reason is that the use of an A/D converter and digital multiplier is a prerequisite condition, and filtering is performed by an active element, which increases power consumption.

An object of the present invention is therefore to provide a technique for achieving power saving and low cost in a configuration in which a reference phase used for demodulation of a phase-modulated signal is detected.

Solution to Problem

A phase synchronization device according to the present invention includes: a sampling section that samples a phase-modulated continuous-time signal to generate a quantized signal; and a synchronization section that detects a reference phase synchronized with the phase of the quantized signal in a digital signal region. The sampling section includes: a sampling filter that converts the continuous-time signal into a discrete-time signal and applies filtering of low-pass characteristics to the discrete-time signal; and a one-bit quantizer that applies filtering of high-pass characteristics to the discrete-time signal that has passed through the sampling filter and outputs, as the quantized signal, a signal representing a time-dependent change in the discrete-time signal by the filtering. The synchronization section includes: a phase difference detector that calculates the phase difference between an inspection signal and the quantized signal; and a delay control circuit that feeds back the inspection signal to the phase difference detector at the timing set in consideration of a delay amount corresponding to the phase difference calculated by the phase difference detector.

A phase synchronization method according to the present invention includes: a sampling step that samples a phase-modulated continuous-time signal to generate a quantized signal; and a synchronization step that detects a reference phase synchronized with the phase of the quantized signal in a digital signal region. The sampling step includes: converting the phase-modulated continuous-time signal into a discrete-time signal, applying filtering of low-pass characteristics to the discrete-time signal, and applying filtering of high-pass characteristics to the discrete-time signal that has passed through the filtering of low-pass characteristics to generate the quantized signal representing a time-dependent change in the discrete-time signal. The synchronization step includes: calculating the phase difference between an inspection signal and the quantized signal, outputting a new inspection signal at the timing set in consideration of a delay amount corresponding to the phase difference, and detecting the phase of the new inspection signal as a reference phase when the phase difference between the new inspection signal and current quantized signal shows the same phase.

ADVANTAGEOUS EFFECTS OF INVENTION

According to the present invention, it is possible to achieve power saving and low cost in a configuration in which a reference phase used for demodulation of a phase-modulated signal is detected.

DESCRIPTION OF EMBODIMENTS

Preferred exemplary embodiments for practicing the present invention will be described in detail with reference to the accompanying drawings. It should be noted that the present invention is not limited to the following exemplary embodiments.

First Exemplary Embodiment

Explanation of Configuration

Figure 1:
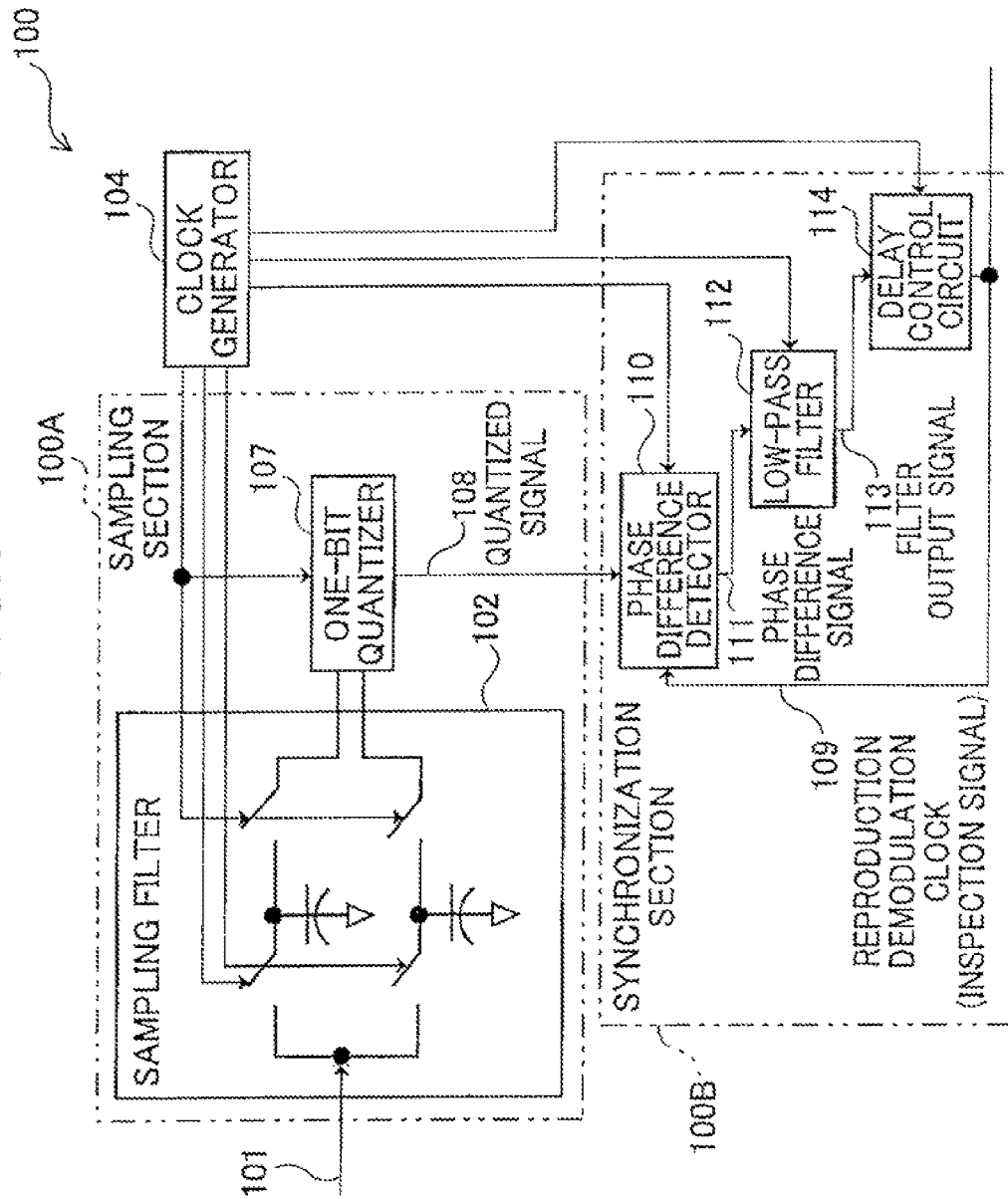
FIG. 1 A block diagram of a phase synchronization device according to a first exemplary embodiment of the present invention.

FIG. 1 is a block diagram illustrating a configuration of a phase synchronization device 100 according to a first exemplary embodiment of the present invention. The phase synchronization device 100 is provided at the subsequent stage of a front-end section (not shown) of a communication receiver. Upon reception of a signal that has been phase-modulated on the transmission side, the front-end section applies amplification, frequency conversion, filtering, etc., so as to put the reception signal into a condition suitable for demodulation and inputs the resultant signal to the phase synchronization device 100 as a reception signal 101.

In the case of a wireless communication, the front-end section includes an antenna, a low noise amplifier, a mixer, a communication band limiting filter, an interfering wave removal filter, and the like. In the case of a wired communication, the front-end section includes a reception input buffer designed in accordance with a transmission side output impedance and a transmission line characteristic impedance.

As illustrated in FIG. 1, the phase synchronization device 100 includes a sampling section 100A, a synchronization section 100B, and a clock generator 104. The sampling section 100A samples the reception signal that has passed through the front-end section to generate a quantized signal 108. The synchronization section 100B detects a reference phase synchronized with the phase of the quantized signal 108, in the digital signal region. The clock generator 104 supplies a common clock signal to the sampling section 100A and synchronization section 100B.

The sampling section 100A includes a sampling filter 102 for converting the reception signal 101 which is a continuous-time signal into a discrete-time signal and a one-bit quantizer 107 for generating the quantized signal 108 representing a time-dependent change of the discrete-time signal.

Figure 2:
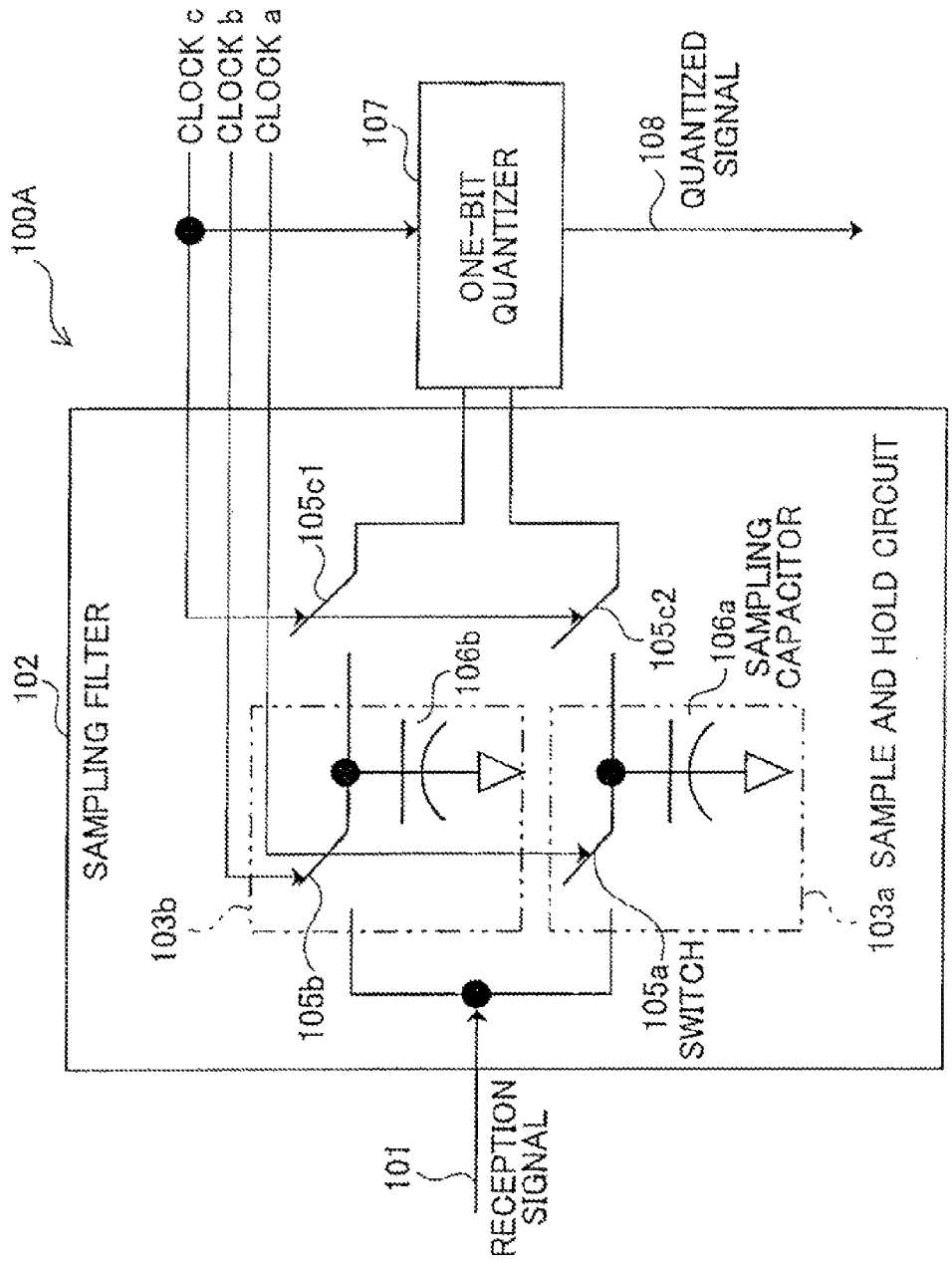
FIG. 2 A block diagram of a sampling section according to the first exemplary embodiment of the present invention.

FIG. 2 illustrates a detailed configuration of the sampling section 100A. The reception signal 101 that has been input to the sampling filter 102 is then input to a two-system sample-and-hold circuit (103a and 103b). The sample and hold circuits 103a and 103b each have filter characteristics defined by a sampling clock of a frequency fs supplied from the clock generator 104.

Sampling switches 105a and 105b in the sample and hold circuits 103a and 103b repeat ON/OFF operation according to clock signals "a" and "b" supplied thereto. Sampling capacitors 106a and 106b accumulate signals input thereto when switches 105a and 105b are tuned ON. Switches 105c1 and 105c2 are output switches operating according to a clock signal "c". The signals accumulated in the sampling capacitors 106a and 106b are output to the one-bit quantizer 107 when the switches 105c1 and 105c2 are tuned ON.

The one-bit quantizer 107 generates, according to a clock signal supplied from the clock generator (104), the quantized signal 108 representing a time-dependent change of the discrete-time signal output from the sampling filter 102. The generated quantized signal 108 is output to the synchronization section 100B.

As illustrated in FIG. 1, the synchronization section 100B includes a phase difference detector 110, a low-pass filter 112, and a delay control circuit 114. The phase difference detector 110 outputs a phase difference signal 111 representing the phase difference between the quantized signal 108 output from the one-bit quantizer 107 and a reproduction demodulation clock 109 to be described later fed back from the delay control circuit 114.

The low-pass filter 112 removes a high-frequency component which is noise for the phase difference signal 111 and outputs the resultant signal to the delay control circuit 114. The delay control circuit 114 generates a signal representing a time delay amount corresponding to the phase difference represented by the noise-removed phase difference signal 111, i.e., a filter output signal 113. Then, the reproduction demodulation clock 109 is fed back to the delay control circuit 114 at a timing set in consideration of the time delay amount. The reproduction demodulation clock corresponds to an inspection signal of the present invention.

First Exemplary Embodiment

Explanation of Operation

Operation of the phase synchronization device 100 having the configuration described above will be described with reference to a flowchart illustrated in FIG. 3. The reception signal 101 of a frequency 11 input to the sampling filter 102 is sampled by the sample and hold circuits 103a and 103b according to the clocks "a" and "b" each having a frequency fs0 and the sampled values are held by the sample and hold circuits 103a and 103b. As a result, the reception signal 101 is converted from a continuous-time signal into a discrete-time signal (step S1).

Figure 4:
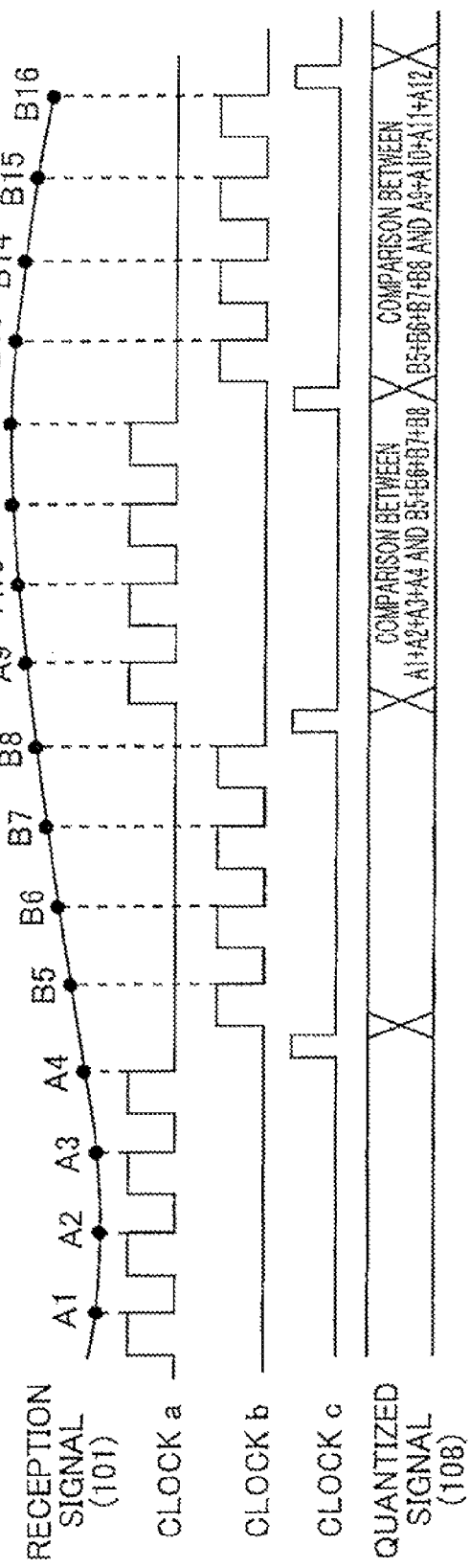
FIG. 4 An explanatory view concerning operation timing of the sampling section according to the first exemplary embodiment.

FIG. 4 illustrates an example of the sampling performed by the sampling filter 102. As illustrated in FIG. 4, the reception signal 101 is converted into discrete signals of A1 to A4 and A9 to A12 according to the clock "a" and discrete signals of B5 to B8 and B13 to B16 according to the clock "b". The values of A1 to A4 are held in the sampling capacitor 106a as an analog addition value (A1+A2+A3+A4), and values of A9 to A12 are held in the sampling capacitor 106a as an analog addition value (A9+A10+A11+A12). Similarly, the values of B5 to B8 and values of B13 to B16 are held in the sampling capacitor 106b as analog addition values.

The sampling filter 102 calculates the moving average of a block of four sampling points held in the sampling capacitors 106a and 106b. As a result of this calculation, a filter exhibiting low-pass characteristics is formed (step S2 of FIG. 3). The transfer function of the formed filter is represented by the following <Expression 1>.

$$H0(z)=(¼)×[1+z-1+z-2+z-3] \qquad \text{<Expression 1>}$$

where $z=\exp(j×2\pi×fs0)$

When the switches 105c1 and 105c2 are tuned ON according to the clock "c" having a frequency (fs0)/4, the signal that has been subjected to the filtering with low-pass characteristics according to the <Expression 1> is output to the one-bit quantizer 107. More specifically, the average value of, e.g., A1+A2+A3+A4 is output from the sampling capacitor 106a, and average value of, e.g., B5+B6+B7+B8 is output from the sampling capacitor 106b.

The one-bit quantizer 107 compares the two average values output from the sampling filter 102, that is, calculates the subtraction of two sampling points. As a result of the subtraction, a filter exhibiting high-pass characteristics is formed (step S3). The transfer function of the formed filter is represented by the following <Expression 2>.

$$H1(z)=1-z-1 \qquad \text{<Expression 2>}$$

where z=exp[j×2π×(fs0/4)]

In terms of results, a filter formed by the sampling filter 102 and one-bit quantizer 107 is a band-pass filter obtained by synthesizing the moving average low-pass filter represented by the <Expression 1> and subtractive high-pass filter represented by the <Expression 2>. The frequency characteristics of this filter is illustrated in FIG. 5.

Figure 5:
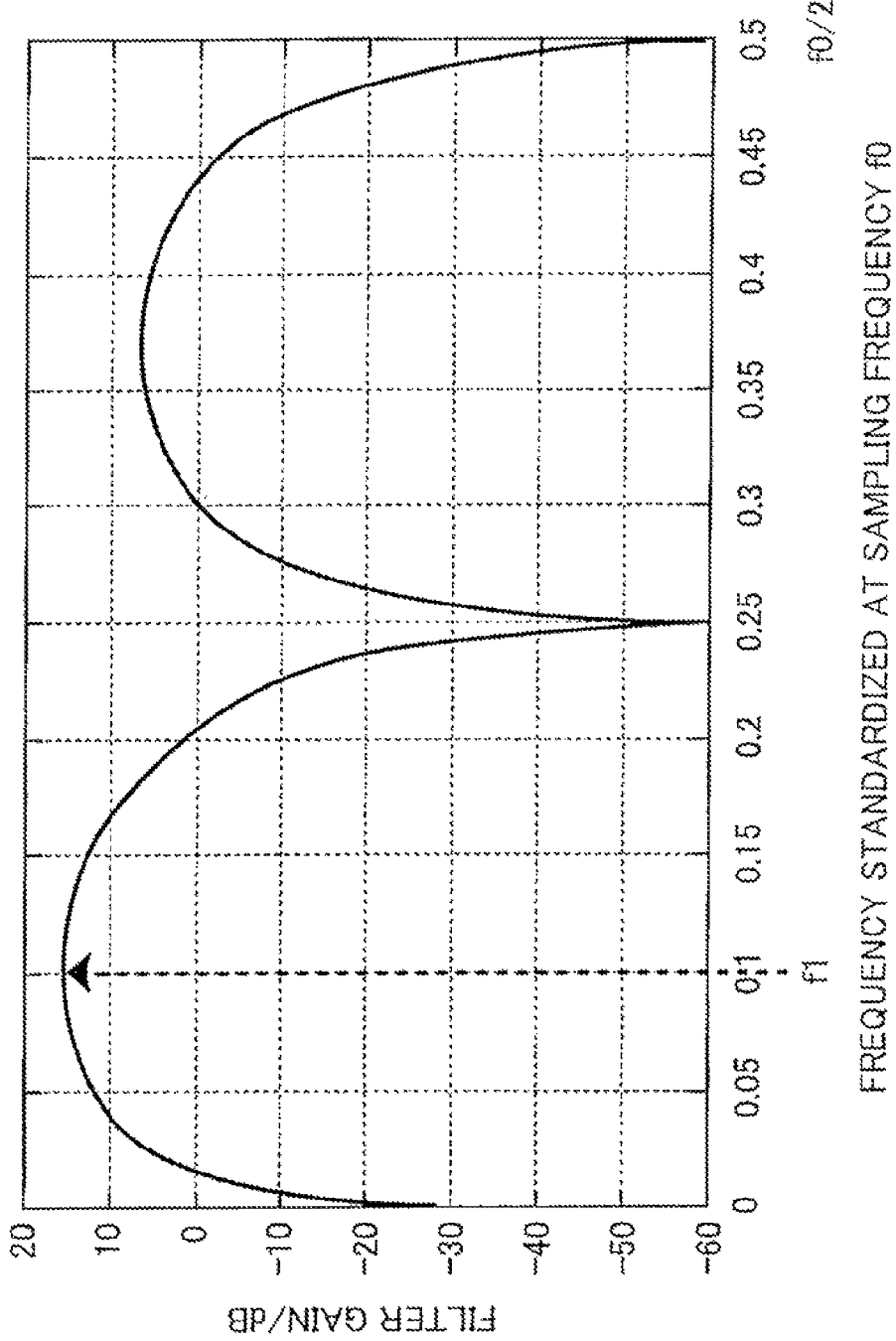
FIG. 5 An explanatory view of filter characteristics formed by the sampling section according to the first exemplary embodiment of the present invention.

With the band-pass characteristics as illustrated in FIG. 5, noise included as a harmonic signal of a frequency 2×f1, 3×f1, and the like or noise such as thermal noise added when the signal passes through the front-end section of the precedent stage is removed. The characteristics of the band-pass filter may be changed in accordance with the degree of noise mixed into the reception signal (101).

The filter characteristics represented by the <Expression 1> and <Expression 2> are characteristics of so-called a finite impulse response filter that does not have a process of feeding back a part of output as an input. In order to obtain steep cutoff characteristics by using the finite impulse response filter, a comparatively large number of calculation stages are required. Thus, in the case where it is estimated that a large amount of noise is mixed, an infinite impulse response filter that feeds back a part of output as an input may be used. This reduces the number of calculation stages.

In order to prevent intensity loss of the reception signal (101) caused due to use of the band-pass filter, it is desirable to set the filter characteristics such that the frequency f1 of the reception signal (101) is located at the maximum gain point (denoted by a broken arrow) in the frequency characteristics of FIG. 5.

The quantized signal 108 output from the one-bit quantizer 107 represents the time rate of change in the interval 1/(fs0/4) in the case where the reception signal 101 is regarded as a sine wave. Referring to FIG. 4, in the case where the average value of the zone A1 to A4 is larger than that of the subsequent zone B5 to B8 (Yes in step S4 of FIG. 3), the one-bit quantizer 107 outputs a signal of "1". This signal represents that a change in the reception signal on the time axis has a positive slope (step S5). In the reverse case (No in step S4), the one-bit quantizer 107 outputs a signal of "0" representing that a change in the reception signal on the time axis has a negative slope (step S6). As described above, the one-bit quantizer 107 of the present exemplary embodiment simply represents the time-dependent change of the reception signal waveform with binary values of "0" and "1".

In the present exemplary embodiment, the linear distortion of the reception signal 101 is removed to some extent by the filter formed in the sampling section 100A. Therefore, in the synchronization section 100B of the subsequent stage, it is sufficient to obtain binary level information as information representing the time-dependent change of the reception signal 101. Further, the use of the one-bit quantizer 107 simplifies the circuit configuration, thereby enabling a reduction in the circuit scale.

The operation shifts to the operation of combining the phase of the quantized signal 108 and phase of the inspection signal (reproduction demodulation clock 109) for phase synchronization.

Figure 3:
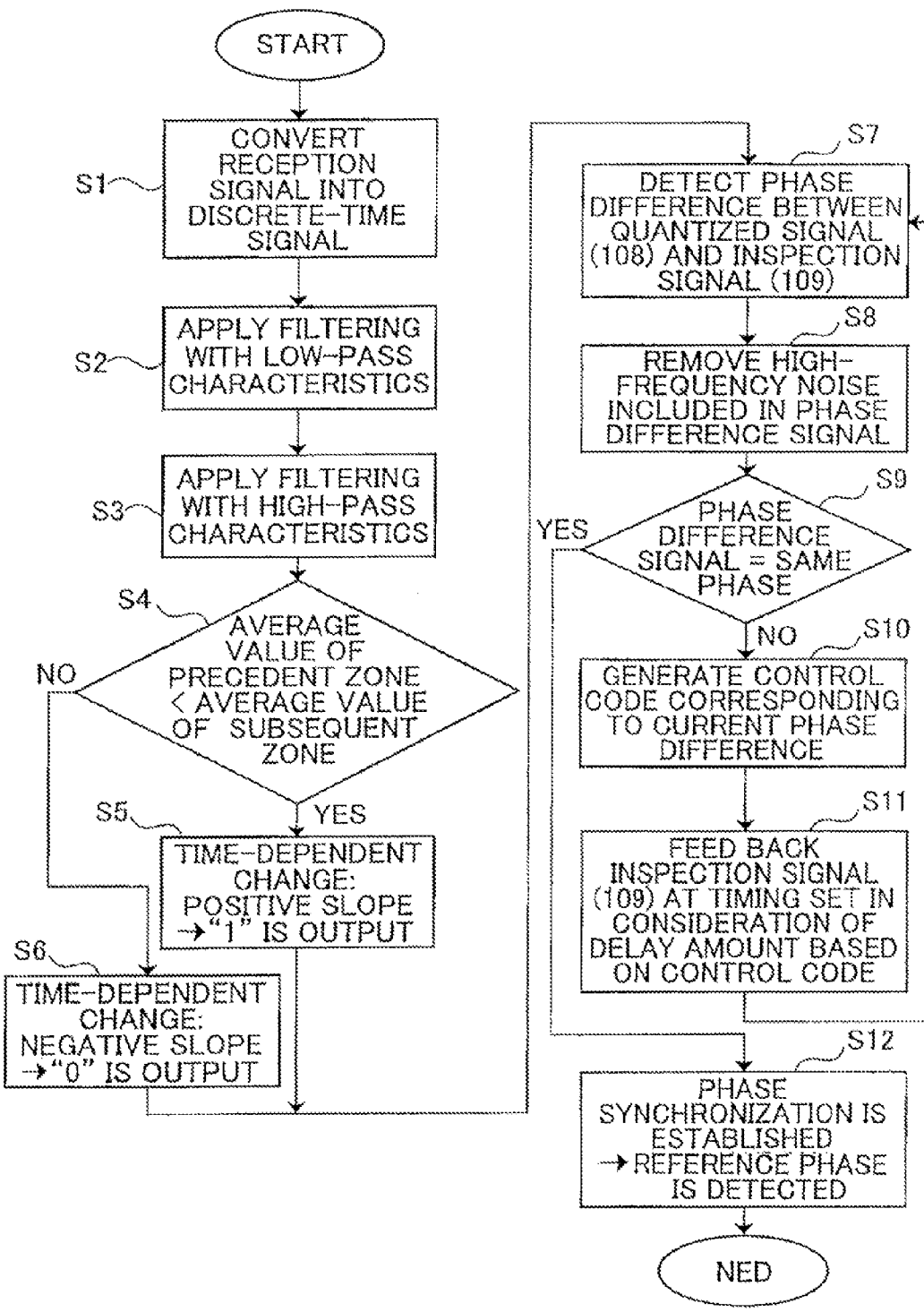
FIG. 3 A flowchart of an operation procedure according to the first exemplary embodiment.

The phase difference detector 110 detects the time difference between the rising edge of the quantized signal 108 and rising edge of the reproduction demodulation clock 109 serving as the inspection signal and outputs the detected time difference as the phase difference signal 111 (step S7 of FIG. 3). In the embodiment, NOT gates 110a and 110c, and NAND gate 110b constituted as shown in FIG. 6 are used as The phase difference detector 110.

Originally, the phase difference signal 111 represents the time difference between the rising edges of the reproduction demodulation clock 109 and quantized signal 108. Actually, however, the phase difference signal 111 includes high-frequency noise that has been mixed along the way to the phase difference detector 110. Thus, the low-pass filter 112, which is a digital filter, is used to remove the high frequency noise (step S8). This facilitates extraction of the time difference information from the phase difference signal 111.

Figure 6:
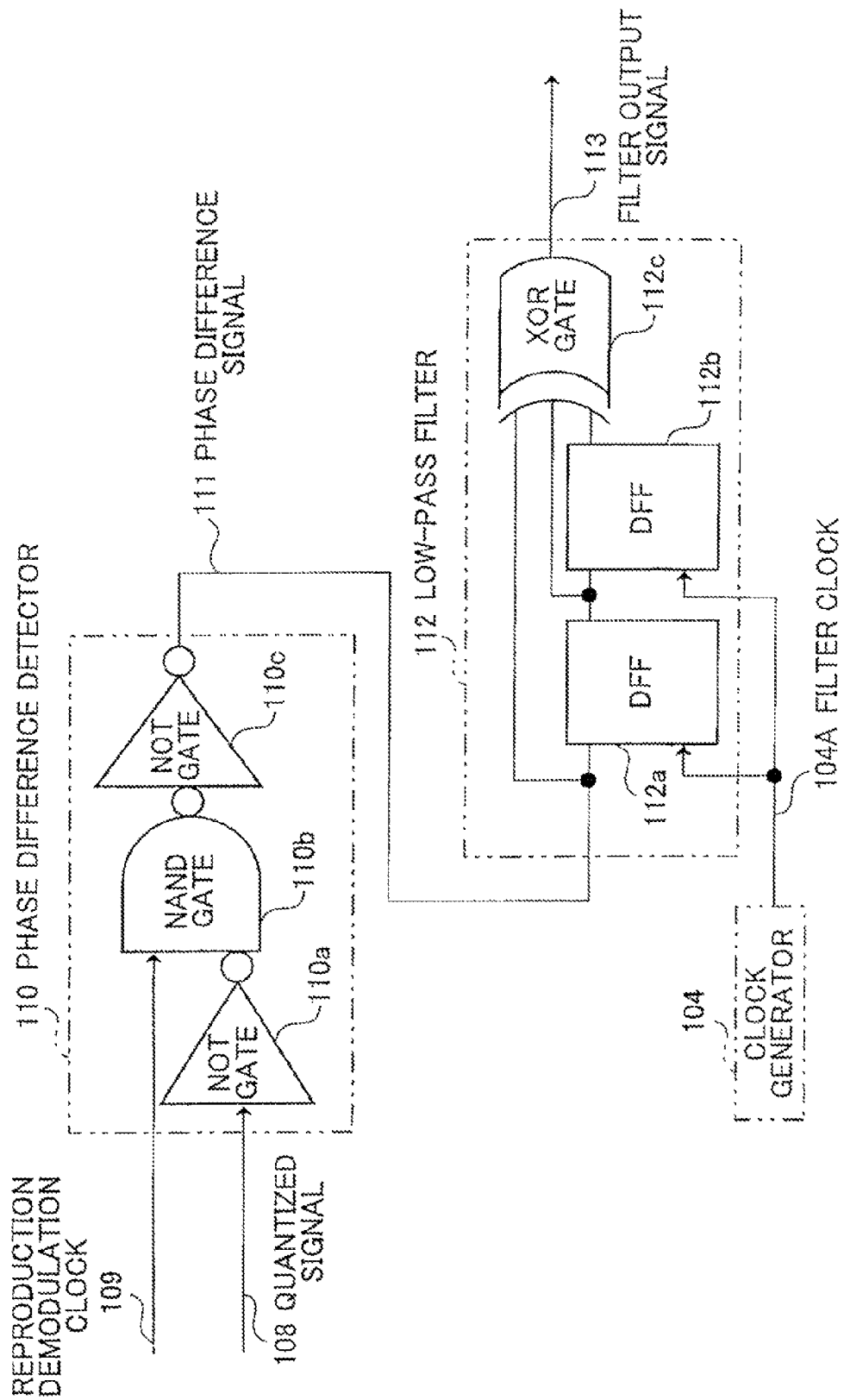
FIG. 6 A block diagram of the first half of the synchronization section according to the first exemplary embodiment of the present invention.

For example, as illustrated in FIG. 6, the low-pass filter 112 may be constituted by delay flip-flop circuits (DFF) 112a and 112b operating according to a filter clock 104A supplied from the clock generator 104, and an XOR gate 112c.

Figure 7:
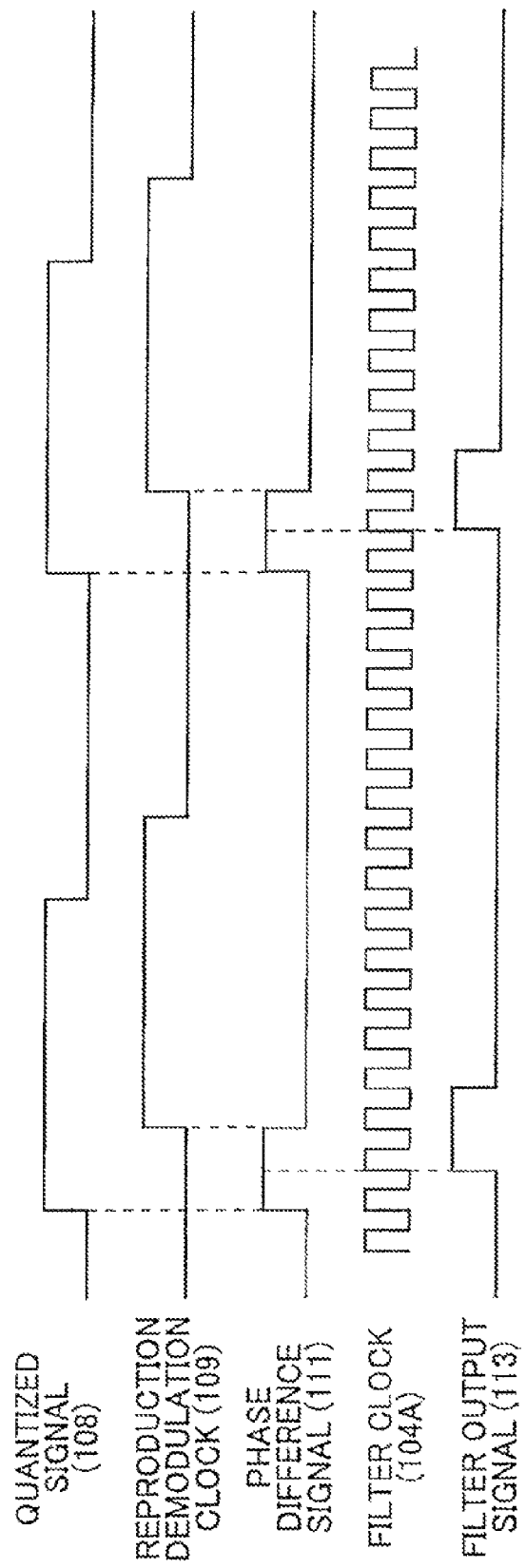
FIG. 7 An explanatory view concerning operation timing of the synchronization section according to the first exemplary embodiment of the present invention.

FIG. 7 illustrates the waveform of the phase difference signal 111 corresponding to the phase difference between the quantized signal 108 and reproduction demodulation clock 109 and waveform of the filter output signal 113 generated according to the filter clock 104A. In this example, the low-pass filter 112 outputs, as the filter output signal 113, the moving average of the phase difference signal 111 at three consecutive timings which is based on the filter clock 104A.

The characteristics of the low-pass filter 112 are appropriately set in accordance with noise that can be included in the phase difference signal 111. Since the low-pass filter 112 is a digital filter (FIG. 6) constituted by only the logic gates as described above, the characteristics can comparatively easily be controlled.

It is useful to increase the order of the low-pass filter 112 in order to accurately remove noise. However, the more the order is increased, the longer the loop convergence time, i.e., the time from the operation start to the time at which the feedback loop has a constant value. Thus, it is desirable to design the filter characteristics while considering the trade-off relationship between the noise characteristics and convergence time.

The phase difference signal 111 is subjected to removal of the high-frequency noise by the low-pass filter 112 and then input to the delay control circuit 114 as the filter output signal 113. The delay control circuit 114 determines whether the input filter output signal 113 exhibits the same phase as those of the quantized signal 108 and reproduction demodulation clock 109. While the reproduction demodulation clock 109 has not yet been synchronized with the quantized signal 108, e.g., at the starting point of the synchronization processing, the filer output signal 113 does not exhibit the same phase (No in step S9 of FIG. 3).

The delay control circuit 114 generates a control code corresponding to the current phase difference so as to make the filter output signal 113 exhibit the same phase (step S10) and feeds back the reproduction demodulation clock 109 serving as the inspection signal to the phase difference detector 110 at a delayed timing based on the control code (step S11).

Figure 8:
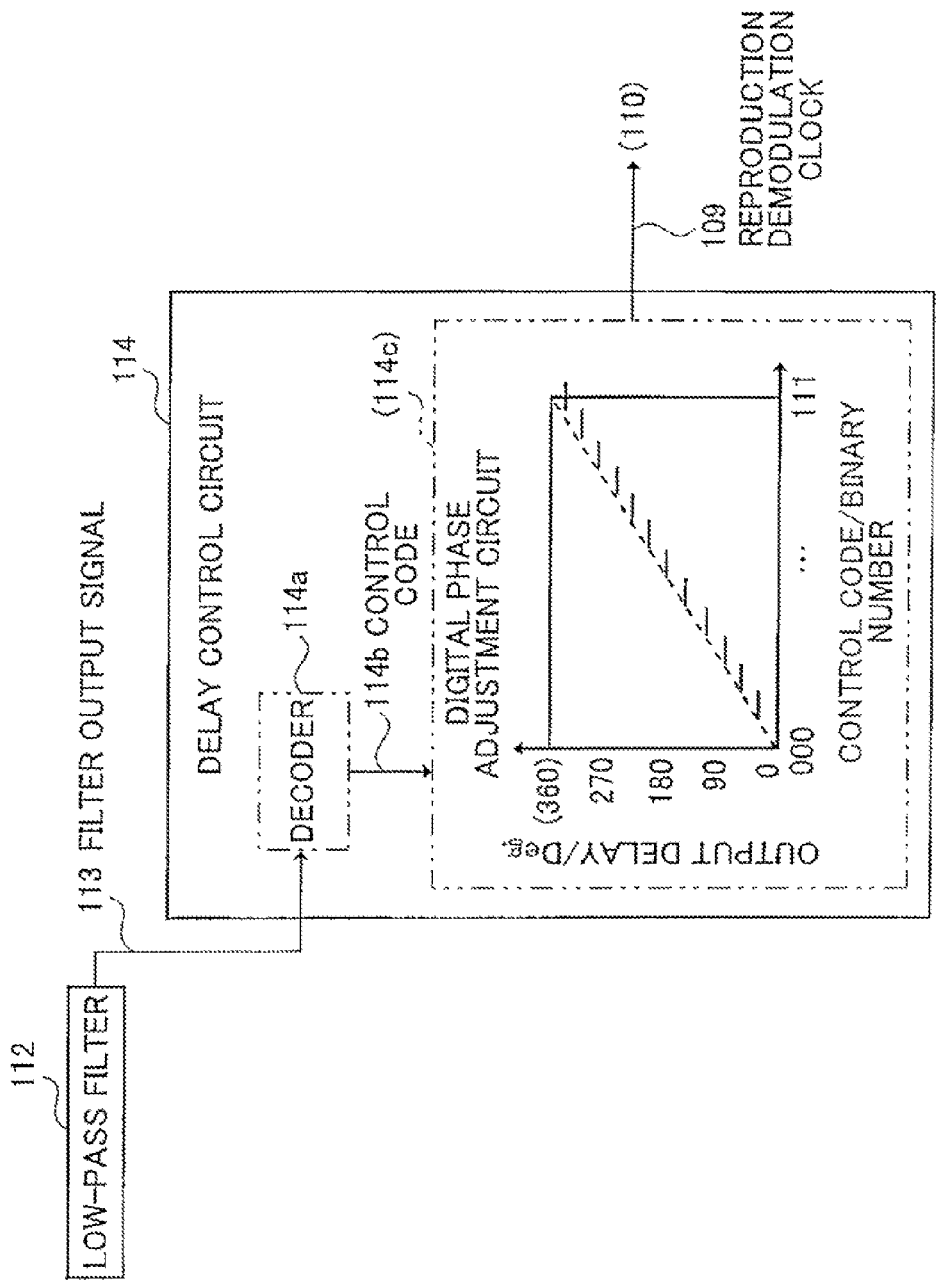
FIG. 8 A block diagram of the last half of the synchronization section according to the first exemplary embodiment of the present invention.

The above operation of the delay control circuit 114 may be implemented by a configuration illustrated in FIG. 8. In the delay control circuit 114 of FIG. 8, a digital phase adjustment circuit 114c is a digital circuit that discretely controls the rising edge position of the reproduction demodulation clock 109. As illustrated in FIG. 8, the digital phase adjustment circuit 114c identifies the delay amount ([Deg.]) to be added to the output timing of the reproduction demodulation clock 109, based, on a control code 114b (binary number) output from a decoder 114a. The decoder 114a generates the control code 114b corresponding to the phase difference represented by the filter output signal 113 output from the low-pass filter 112.

More in detail, as described above, the pulse width of the filter output signal 113 corresponds to the time difference between the rising edge of the quantized signal 108 and rising edge of the reproduction demodulation clock 109. The filter output signal 113 exhibits a certain amount of phase difference until the phase synchronization is established. The above operation of the delay control circuit 114 is the operation of feeding back the reproduction demodulation clock 109 to the phase difference detector 110 at the timing set in consideration of a delay amount corresponding to the current phase difference. This operation is repetitively performed so as to make the phase difference represented by the filter output signal 113 converge to 0.

When the phase difference represented by the filter output signal 113 has converged to 0 (Yes in S11), the delay control circuit 114 recognizes that the phase synchronization between the reception signal 101 and reproduction demodulation clock 109 has been established (step S12). The phase of the reproduction demodulation clock 109 at this time point corresponds to the reference phase to be detected in the synchronization section 10B. Thereafter, the one-bit quantizer 107 demodulates the reception signal using the detected reference phase, whereby data can be reproduced properly.

In general, the phase of a carrier wave of a reception signal always fluctuates due to mixing of various noise components. In the case of a phase-shift that fluctuates with a short period at a high frequency, the convergence time of the feedback loop is comparatively short. On the other hand, in the case of a phase-shift that fluctuates with a long period, the convergence time tends to be long. Further, the phase-shift that fluctuates with a long period causes degradation of bit error rate particularly in the case of communication with a large amount of data. Thus, it is desirable to determine the period of the phase shift or convergence time of the loop depending on the amount of data handled in communication.

According to the present exemplary embodiment, it is possible to eliminate the need of providing a high resolution power/high sampling rate A/D converter which has been required in a conventional technique in which the reference phase is detected in the digital signal region. This enables a reduction in the circuit scale and power consumption.

In addition to the noise removal of the low-pass filter 112 in the synchronization section 100B, filtering for noise removal is performed in the sampling section 100A of the precedent stage that operates according to the same clock as the synchronization section 100B (FIG. 5). That is, in the sampling section 100A of the precedent stage that operates according to the same clock as the synchronization section 100B, a certain amount of noise has already been removed from the quantized signal 108 to be input to the synchronization section 100B, which prevents the convergence time of the subsequent loop processing in the synchronization section 100B from being increased.

Further, the sampling section 100A can be utilized not only for the phase synchronization processing described in the above exemplary embodiment but also for subsequent data demodulation processing. This configuration contributes to a reduction of the size of the entire reception circuit.

Second Exemplary Embodiment

Explanation of Configuration

Figure 9:
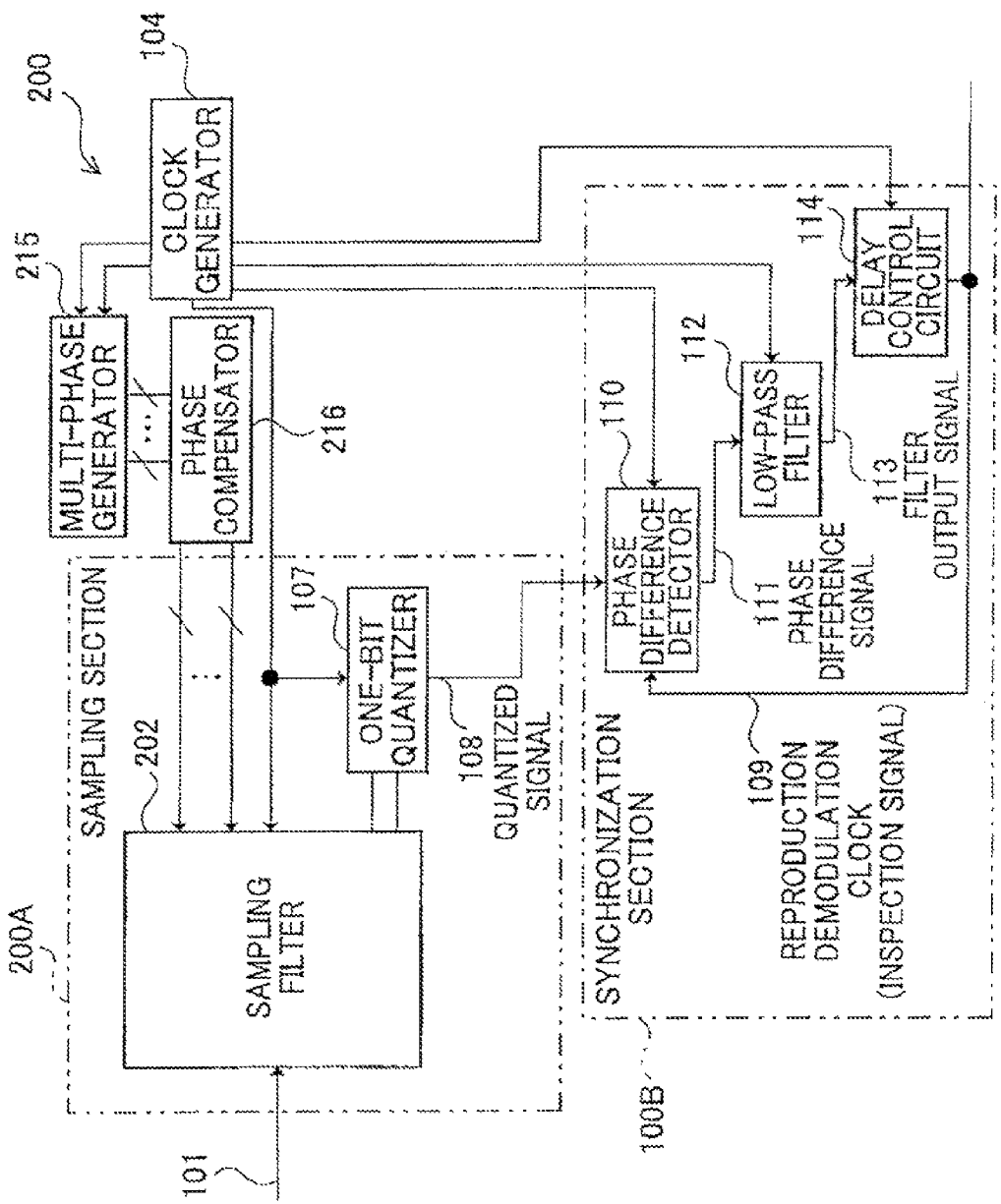
FIG. 9 A block diagram of the phase synchronization device according to a second exemplary embodiment of the present invention.

FIG. 9 illustrates a configuration of a second exemplary embodiment of the present invention. The same reference numerals are given to those components that are the same as the corresponding components of the first embodiment (FIG. 1).

A phase synchronization device 200 of the present exemplary embodiment includes a sampling section 200A, the synchronization section 100B, the clock generator 104, a multi-phase generator 215, and a phase compensator 216. The multi-phase generator 215 converts a clock signal to be supplied from the clock generator 104 to a sampling switch of a sampling filter 202 into multi-phase clock signals. The phase compensator 216 compensates the correlation skews of the multi-phase clock signals to be input to the sampling filter 202, that is, compensates the phase variation between the multi-phase clock signals.

Figure 10:
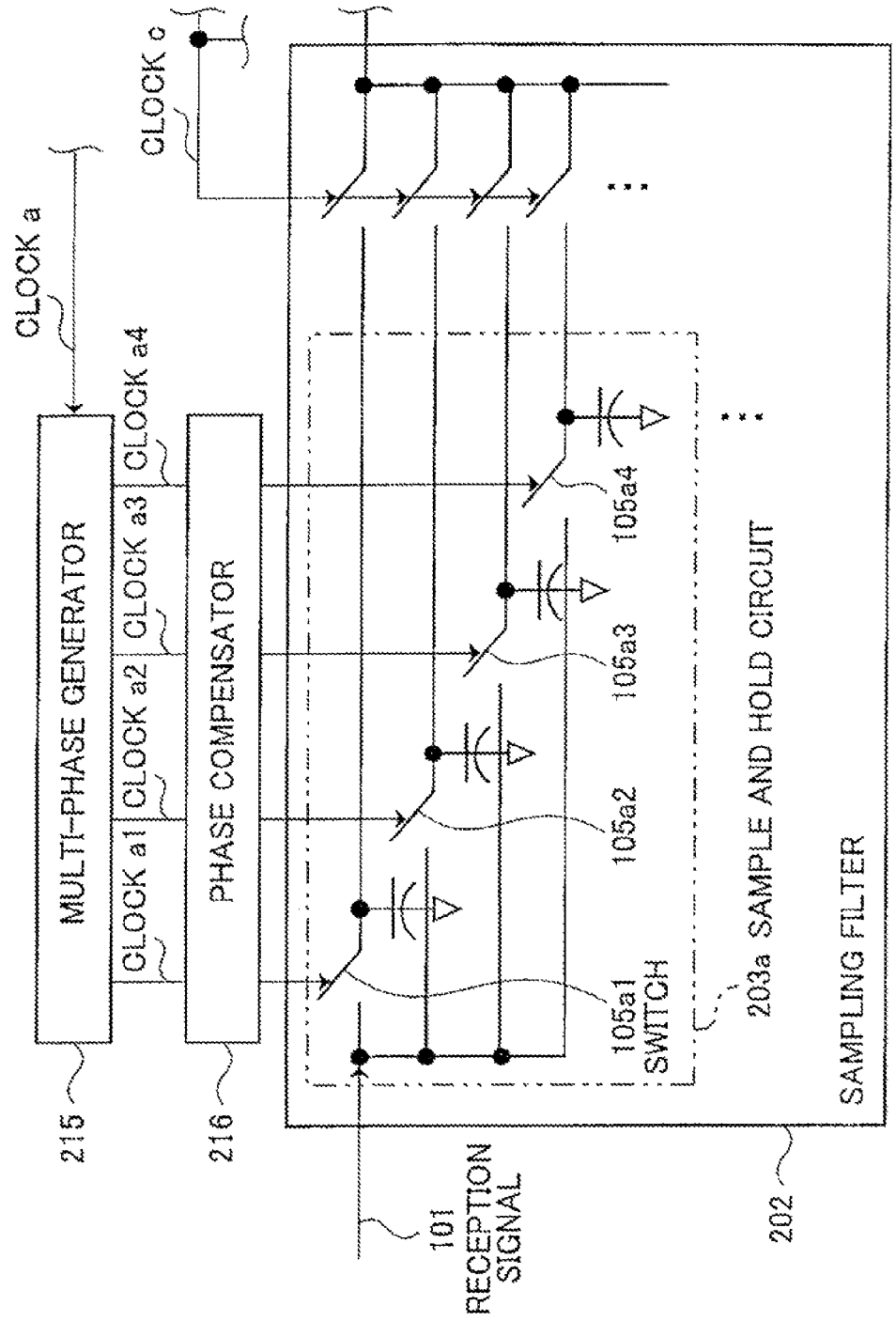
FIG. 10 A block diagram concerning a sampling filter according to the second exemplary embodiment of the present invention.

FIG. 10 illustrates a part of a configuration of the sampling filter 202 according to the present exemplary embodiment. The configuration illustrated relates to a clock a which is one of clock signals output from the clock generator (104). The sampling filter 202 has a sample and hold circuit 203a receiving clock a1 to a4 obtained by multi-phasing the clock "a". Although not illustrated in FIG. 10, the sampling filter 202 has sample and hold circuits corresponding to the number of multi-phases of clocks other than the clock a.

The basic configuration of the sample and hold circuit 203a corresponds to the configuration of the sample and hold circuit 103a (FIG. 2) according to the above first exemplary embodiment. That is, the sample and hold circuit 203a has sampling switches 105a1 to 105a4 that turn ON/OFF according to the clocks a1 to a4 and accumulates discrete-time signals of the reception signal 101 in respective sampling capacitors at ON time of the sampling switches.

Second Exemplary Embodiment

Explanation of Operation

Operation of the phase synchronization device 200 having the configuration described above will be described. The operation of the synchronization section 100B according to the present exemplary embodiment is the same as that of the first exemplary embodiment, and the description thereof will be omitted. In the following, a part of the operation of the sampling section 200A different from that of the sampling section 100A of the first exemplary embodiment will mainly be described.

The multi-phase generator 215 divides the phase of the clock "a" input from the clock generator 104 to generate clocks a1 to a4 of four phases and outputs the generated clocks to the phase compensator 216. The phase compensator 216 adjusts the correlation skews of the clocks a1 to a4 and sequentially inputs the resultant clocks to the sample and hold circuit 203a. More concretely, as illustrated in FIG. 10, the clock a1 is input to the switch 105a1 of the sample and hold circuit 203a, clock a2 is input to the switch 105a2, clock a3 is input to the switch 105a3, and clock a4 is input to the switch 105a4.

Figure 11:
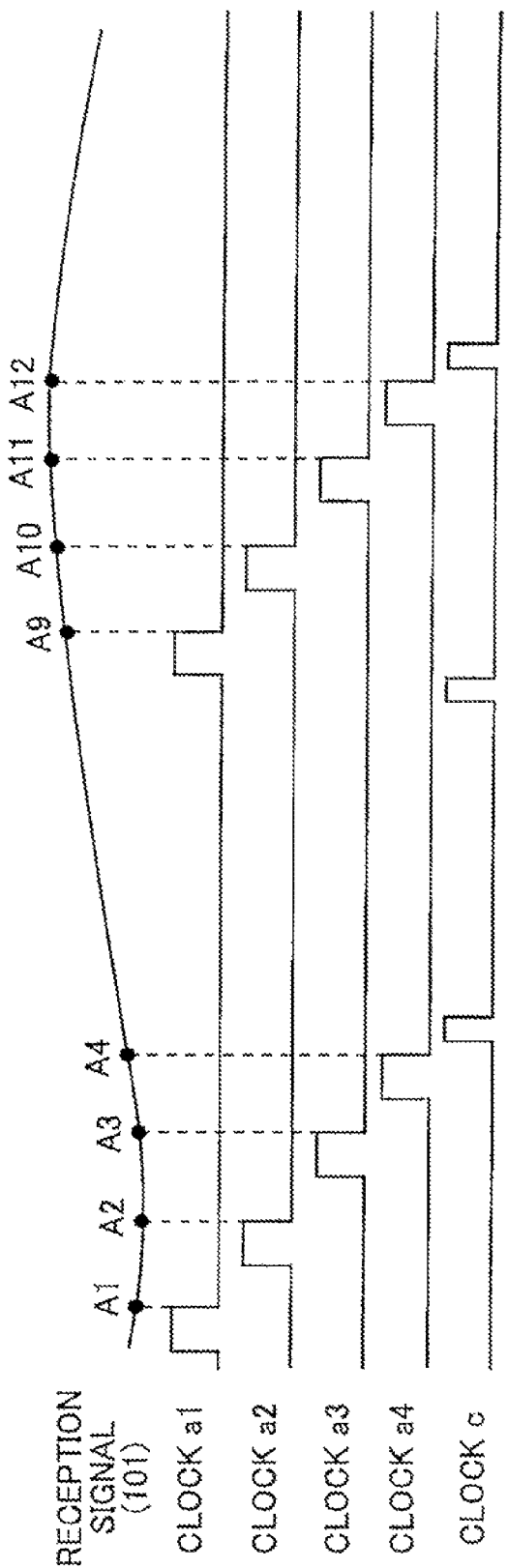
FIG. 11 An explanatory view concerning operation timing of the sampling filter according to the second exemplary embodiment of the present invention.
Figure 12:
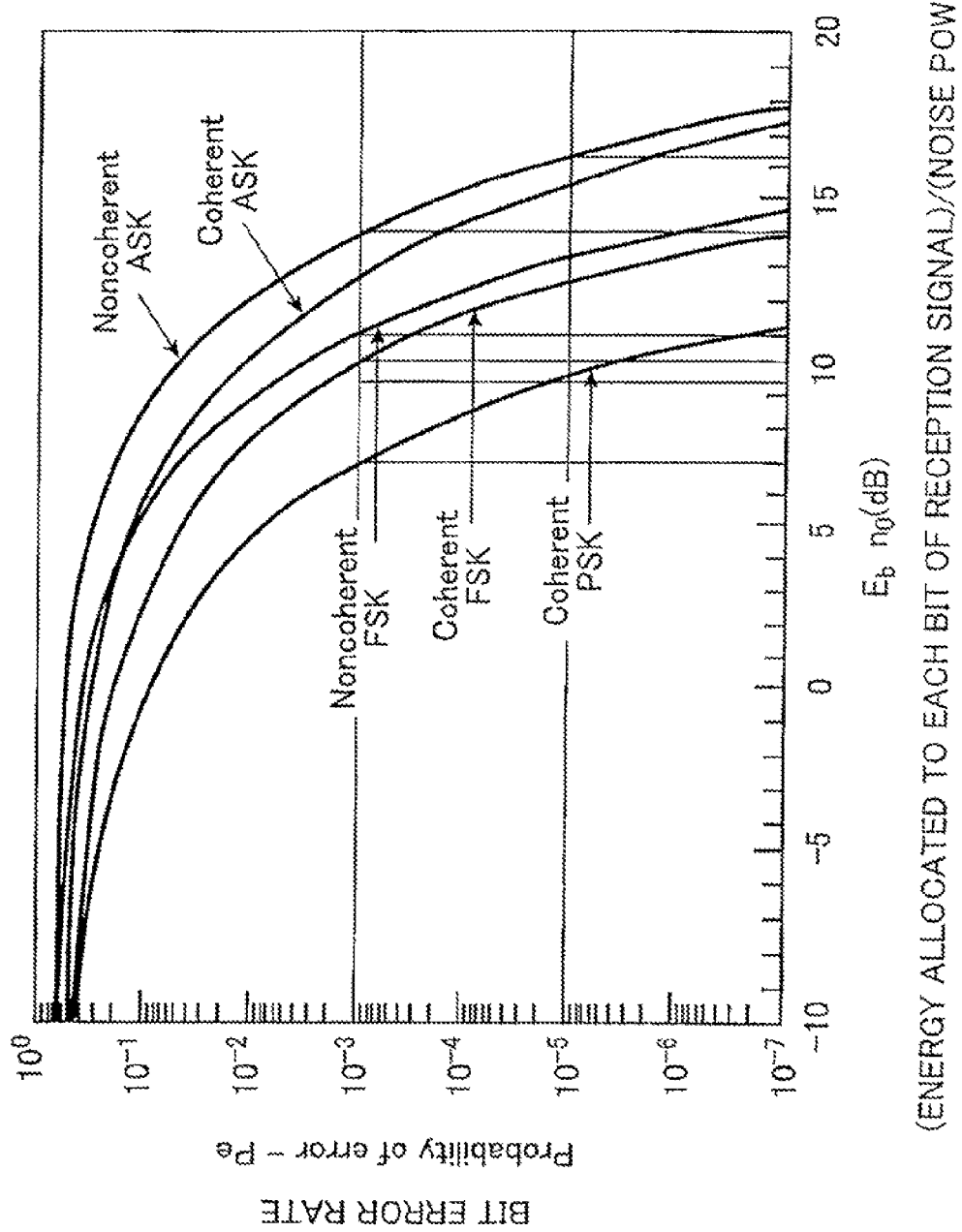
FIG. 12 An explanatory view illustrating bit error rate according to the type of a digital modulation method which is disclosed in NPL 1.

FIG. 11 illustrates the timing relationship between the clocks a1 to a4 and clock "c". In the above first exemplary embodiment, consecutive sample values like A1 to A4 (FIG. 4) from a single-phase clock "a". On the other hand, in the present exemplary embodiment, as illustrated in FIG. 11, the multi-phased clocks a1 to a4 are used to acquire consecutive sample values based on the plurality of clocks. For example, in the case of the sample values A1 to A4, the clock a1 is used to acquire A1, clock a2 is used to acquire A2, clock a3 is used to acquire A3, and clock a4 is used to acquire A4.

The sampling filter 202 adds the acquired sample values (A1+A2+A3+A4) at the timing of the clock "c" and outputs the average value of the added value to the one-bit quantizer 107. This operation is the same as that of the above first exemplary embodiment.

According to the second exemplary embodiment, the clock signal for obtaining consecutive sample values is multi-phased, so that the sampling frequency can easily be increased. This is useful in, e.g., an environment where it is difficult to sufficiently increase the sampling frequency.

The present invention is not limited to the above exemplary embodiments and may appropriately be modified within the scope of the claims of the invention. For example, the low-pass filter 112 is provided at the subsequent stage of the phase difference detector 110 in order to remove high-frequency noise included in the phase difference signal 111 in the above exemplary embodiments; however, in the case where the noise can sufficiently be removed by the filtering (FIG. 5) in the sampling section 100A, the low-pass filter 112 need not be provided in the synchronization section 100B. Thus, the processing time in the synchronization section 100B can be reduced by the amount corresponding to the omission of the filtering processing.

Further, although the single clock generator (104) is used in order to supply a common clock signal to the respective circuits in the phase synchronization device, a plurality of clock generators may be used. In this case, clock signals from the respective generators are previously synchronized with one another before being supplied.

REFERENCE SIGNS LIST

100: Phase synchronization device
101: Reception signal
102: Sampling filter
103a, 103b: Sample and hold circuit
104: Clock generator
105a, 105b: Sampling switch
105c1, 105c2: Output switch
106a, 106b: Sampling capacitor
107: one-bit quantizer
108: Quantized signal
109: Reproduction demodulation clock
110: Phase difference detector
111: Phase difference signal
112: Low-pass filter
113: Filter output signal
114: Delay control circuit

The invention claimed is:

1. A phase synchronization device comprising:
a sampling section that samples a phase-modulated continuous-time signal to generate a quantized signal; and
a synchronization section that detects a reference phase synchronized with the phase of the quantized signal in a digital signal region, wherein
the sampling section comprises:
a sampling filter that converts the continuous-time signal into a discrete-time signal and applies filtering of low-pass characteristics to the discrete-time signal; and
a one-bit quantizer that applies filtering of high-pass characteristics to the discrete-time signal that has passed through the sampling filter and outputs, as the quantized signal, a signal representing a time-dependent change in the discrete-time signal by the filtering, and
the synchronization section comprises: a phase difference detector that calculates the phase difference between an inspection signal and the quantized signal; and
a delay control circuit that feeds back the inspection signal to the phase difference detector at the timing set in consideration of a delay amount corresponding to the phase difference calculated by the phase difference detector.

2. The phase synchronization device according to claim 1, further comprising:
a clock generator that supplies a common clock signal to the sampling section and synchronization section, wherein
the sampling section and synchronization section operate according to the common clock signal.

3. The phase synchronization device according to claim 2, wherein
the synchronization section has a low-pass filter that removes high-frequency noise from the signal representing the phase difference calculated by the phase difference detector and supplies the resultant signal to the delay control circuit.

4. The phase synchronization device according to claim 2, further comprising:
a multi-phase generator that receives, from the clock generator, a clock signal to be supplied to the sampling filter and converts the clock signal into multi-phase clock signals; and
a phase compensator that compensates a phase variation between the multi-phase clock signals and outputs the resultant signals to the sampling filter.

5. The phase synchronization device according to claim 1, wherein
the one-bit quantizer outputs a binary signal, as the quantized signal, that represents that the time-dependent change has a positive slop or a negative slope on the time axis.

6. A phase synchronization method comprising:
a sampling step that samples a phase-modulated continuous-time signal to generate a quantized signal; and
a synchronization step that detects a reference phase synchronized with the phase of the quantized signal in a digital signal region, wherein
the sampling step comprises:
converting the continuous-time signal into a discrete-time signal, applying filtering of low-pass characteristics to the discrete-time signal, and applying filtering of high-pass characteristics to the discrete-time signal that has passed through the filtering of low-pass characteristics to generate the quantized signal representing a time-dependent change in the discrete-time signal, and
the synchronization step comprises: calculating the phase difference between an inspection signal and the quantized signal, outputting a new inspection signal at the timing set in consideration of a delay amount corresponding to the phase difference, and detecting the phase of the new inspection signal as a reference phase when the phase difference between the new inspection signal and current quantized signal shows the same phase.

7. The phase synchronization method according to claim 6, wherein
the above steps are executed according to a common clock signal.

8. The phase synchronization method according to claim 7, wherein in the synchronization step, high-frequency noise is removed from the signal representing the phase difference as the delay amount.

9. The phase synchronization method according to claim 7, further comprising:

a step of converting a clock signal for use in conversion of the continuous-time signal into discrete-time which is performed in the sampling step into multi-phase clock signals and compensating a phase variation between the multi-phase signals.

10. The phase synchronization method according to claim 6, wherein in the sampling section, a binary signal that represents that the time-dependent change has a positive slop or a negative slope on the time axis is output as the quantized signal.

* * * * *